Patented May 26, 1953

2,640,006

UNITED STATES PATENT OFFICE 2,640,006

N-ORGANOLEAD-PHTHALIMIDES AS FUNGICIDES

Waldo B. Ligett, Berkley, Rex D. Closson, Detroit, and Calvin N. Wolf, Ferndale, Mich., assignors to Ethyl Corporation, New York, N. Y., a corporation of Delaware No Drawing. Application October 28, 1950, Serial No. 192,809

3 Claims. (Cl. 167—33)

This invention relates to novel organolead compounds. In particular our invention relates to organolead compounds in which the lead atom is linked through a nitrogen atom to a phthalimide.

It is, therefore, an object of our invention to provide a new class of lead compounds. It is a particular object of our invention to provide organolead compounds which find utility as biocides, as for example fungicides, bactericides and insecticides.

In accordance with the present invention we have provided compounds of the general formula

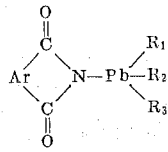

where Ar is o-arylene or substituted o-arylene, and each of $R_1$, $R_2$ and $R_3$ is the same or different and can be alkyl or aryl.

We have discovered that the fundamental structure of our compounds, that is the N-organolead-phthalimide, provides a biocidal material which does not possess certain serious disadvantages associated with prior organolead compounds and which have prevented commercial utilization of the highly potent organolead compounds heretofore known as biocides. Our compounds possess such characteristics of water solubility and volatility that they are particularly useful in applications wherein weathering is encountered, as for example in protecting wood against soil infesting fungi, or in protecting tentage. Furthermore, as seed protectants we obtain long-term protection under adverse storage conditions by employing our compounds.

It is not intended that the scope of our invention be limited by the groups $R_1$, $R_2$, and $R_3$ in the foregoing general formula, as these groups can be chosen from among a broad class of groups without altering the biocidal properties of our compounds. For example, the $R_1$, $R_2$, and $R_3$ groups may be chosen from alkyl and aryl groups, as methyl, ethyl, propyl, isopropyl, amyl, hexyl, octyl, dodecyl, phenyl, tolyl, xylyl, α-naphthyl, β-naphthyl, and ethylphenyl. These hydrocarbon components can also be the same or different. Thus, the trimethyl-, triethyl-, tripropyl-, triphenyl-, dimethylethyl-, diethylmethyl-, dimethylphenyl-, diphenylethyl-, dimethyl-p-methyltolyl-, diethylpropyl- and methylpropylbutyl-lead groups are typical examples of the N-organolead radicals which can be employed with our 2,3-dihydrophthalazine-1,4-diones.

Furthermore, it is not intended that our invention be restricted by the choice of the group Ar. Thus, we can employ o-phenylene itself or substituted derivatives thereof, in various embodiments of the compounds of our invention as well as o-naphthylene. For example, the o-arylene can be substituted with one or more negative groups, as for example the halogens, nitro, amino, mono- and dialkyl-amino, alkoxy or carbolkoxy groups, as well as sulfur-containing negative groups, such as mercapto, trichloromethylthio, and alkyl or aryl mercaptan. In addition two or more such substituents, the same or different, can be substituted at once on the o-arylene radical.

A general method for preparing the N-organolead-phthalimides of our invention comprises treating a solution of a trihydrocarbonlead hydroxide with a phthalimide. Reaction proceeds readily and the products are easily recovered in high yield and high purity as crystalline solids. In the specific examples which follow of the preparation of two typical compounds of our invention, all parts and percentages are by weight.

Example I

N-triethyllead-phthalimide.—A solution of triethyllead hydroxide was prepared by treating a solution of 100 parts of triethyllead bromide in 550 parts of ethanol with 107 parts of silver oxide. At the end of a period of two hours the silver bromide produced and excess silver oxide were removed by filtration and the filtrate was treated with a solution of 39.4 parts of phthalimide in 650 parts of anhydrous ethanol at a temperature of 50° C. After addition of this solution was complete, the ethanol was removed by distillation at a pressure of 0.1 atmosphere. The product which remained as a brown crystalline solid residue was washed with water and dried in a vacuum. The yield was 106 parts, or 90 per cent based on the triethyllead bromide employed. By analysis, the material contained 46.6 per cent of lead, while the formula $C_{14}H_{19}O_2NPb$ requires 47.0 per cent lead.

Example II

N-triethyllead-tetrachlorophthalimide.—A solution of 100 parts of triethyllead hydroxide in 270 parts of ethanol was prepared from triethyllead chloride according to the procedure of the preceding example. To this solution was added 92 parts of tetrachlorophthalimide. After a period of 10 minutes a small quantity (5 parts) of unreacted tetrachlorophthalimide was removed by filtration and the filtrate was treated with 450 parts of water, whereupon the N-triethyllead-tetrachlorophthalimide precipitated and was recovered by filtration. The product, a finely divided white solid was 156 parts, corresponding to a yield of 83 per cent based on the tetrachlorophthalimide consumed. Analysis showed the product to contain 34.7 per cent lead and 23.8 per cent chlorine, while the formula $C_{14}H_{15}O_2NCl_4Pb$ requires 35.8 per cent lead and 24.5 per cent chlorine.

Other N-organolead-phthalimides of our invention can be prepared by a similar process. Thus, when we treat triphenyl lead hydroxide, dimethylethyllead hydroxide, diethylphenyllead hydroxide, dimethyloctyllead hydroxide, or ditolylpropyllead hydroxide with 3-nitrophthalimide, 3-amino-4-nitrophthalimide, 4-trichloromethylthiophthalimide, 3-mercapto-5-methylphthalimide, and 3-chloro-4-fluoro-5-nitrophthalimide, respectively, we obtain N-triphenyllead-3-nitrophthalimide, N-dimethylethyllead-3-amino-4-nitrophthalimide, N-diethylphenyllead-4-trichloromethylthiophthalimide, N-dimethyloctyllead-3-mercapto-5-methylphthalimide, and N-ditolylpropyllead - 3 - chloro - 4 - fluoro - 5 - nitrophthalimide.

The compounds of our invention can be employed as fungicides and for the prevention of the generination of the spores of fungi. To demonstrate the utility of the N-organolead-phthalimides of our invention as fungicidal compositions we determined the concentration at which the germination of 50 per cent of the spores of each of the fungi *Alternaria oleracea* and *Sclerotinia fructicola* is inhibited. The former is responsible for the potato blight, while the latter causes peach rot. The fungi are representative of fungus types which are responsible for heavy crop damage. The ability to control these fungi is a reliable indication of the general applicability of our fungicides to protect these and other important agricultural crops. These tests were conducted as follows: 100 parts of the active ingredient was triturated with 1,000 parts of distilled water containing one part of the commercial dispersant Triton X-100. This standard suspension was thereupon further diluted with distilled water and the concentration at which one-half of the fungi contained in a drop of water on a microscope slide were prevented from sporilating was determined. For example, under these conditions each of N-triethyllead-phthalimide and N-triethyllead-tetrachlorophthalimide was effective at a concentration as low as 1 p. p. m. When the following typical examples of the compounds of our invention are so-applied to cultures of these fungi, they are also effective at a similar low concentration: N-triphenyllead-phthalimide, N-diethylmethyllead-3-nitrophthalimide, and N-diethylphenyllead-3-chloro-5-fluorophthalimide.

Other examples of the novel class of compounds which we have provided will be apparent, those specific examples enumerated herein being merely illustrative. Furthermore, other methods for their preparation will be apparent to those skilled in the art, and the foregoing examples of preparations are presented merely to illustrate one method for their preparation.

We claim:

1. A fungicidal composition consisting essentially of a material having the general formula

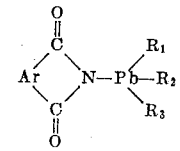

wherein Ar is selected from the group consisting of o-phenylene and o-naphthylene and substituted derivatives thereof wherein said substituents are selected from the group consisting of halogen, nitro, amino, mono, alkylamino, dialkylamino, lower alkoxy, carbalkoxy, mercapto, trichloromethylthio, lower alkyl mercaptan and aryl mercaptan groups and each of $R_1$, $R_2$ and $R_3$ is a hydrocarbon radical selected from the group consisting of alkyl radicals containing 1 to 12 carbon atoms, phenyl radicals, alkyl substituted phenyl radicals and naphthyl radicals, a substantially greater amount of a fungicidally inert carrier therefor, and a surface active agent.

2. A fungicidal composition consisting essentially of N-triethyllead-phthalimide, a substantially greater amount of a fungicidally inert carrier therefor, and a surface active agent.

3. A fungicidal composition consisting essentially of N-triethyllead-tetrachlorophthalimide, a substantially greater amount of a fungicidally inert carrier therefor, and a surface active agent.

WALDO B. LIGETT.
REX D. CLOSSON.
CALVIN N. WOLF.

References Cited in the file of this patent
UNITED STATES PATENTS

| Number | Name | Date |
|---|---|---|
| 2,273,443 | Klos | Feb. 17, 1942 |
| 2,349,344 | Gertler | May 23, 1944 |
| 2,393,925 | Morris | Jan. 29, 1946 |
| 2,460,188 | O'Kane | Jan. 25, 1949 |

OTHER REFERENCES

Chemical Abstract, volume 42, page 1190 citing McCombie et al., Nature, 159, pages 491 to 494 (1947).